United States Patent [19]

Gendler et al.

[11] 4,443,302

[45] Apr. 17, 1984

[54] PRINTING MEDIUM AND USE THEREOF

[75] Inventors: Paul L. Gendler; Robert Twieg, both of San Jose, Calif.

[73] Assignee: International Business Machines Corporation, Armonk, N.Y.

[21] Appl. No.: 454,764

[22] Filed: Dec. 30, 1982

[51] Int. Cl.[3] .................... B41M 5/20; G01D 15/34

[52] U.S. Cl. .................... 204/2; 346/135.1; 427/145

[58] Field of Search .................... 204/2; 346/139.1; 427/145

[56] References Cited

U.S. PATENT DOCUMENTS

| | | | |
|---|---|---|---|
| 2,367,113 | 1/1945 | Gibney | 204/2 |
| 4,211,616 | 7/1980 | Sambucetti | 204/2 |
| 4,309,255 | 1/1982 | Gendler et al. | 204/2 |
| 4,374,081 | 2/1983 | Bernier | 204/2 |

*Primary Examiner*—John F. Niebling

*Attorney, Agent, or Firm*—Pollock, Vande Sande & Priddy

[57] ABSTRACT

A printing medium which includes a substrate coated with a compound of the formula:

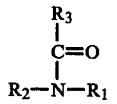

wherein $R_3$ is a ring group having certain substituents in at least one ortho position with respect to the atom connected to C=O; and each $R_1$ and $R_2$ individually is aryl or alkaryl or are interconnected to form with the nitrogen atom a phenothiazine, phenoxazine, or phenazine or substituted derivative; and coated with an oxidizing agent or reduced form thereof; and method of use.

20 Claims, No Drawings

PRINTING MEDIUM AND USE THEREOF

DESCRIPTION

TECHNICAL FIELD

The present invention is concerned with a printable medium of improved stability and to a method for printing employing the medium. The preferred method of the present invention includes the use of nonconsumable electrodes for electrochromic printing. In particular, the present invention is concerned with certain compounds which act as leucodyes in combination with the reduced form of an oxidizing agent to provide printing preferably upon the application of an electrical field.

BACKGROUND ART

In the electrolytic printing art there are at least two general schemes for printing processes. In one such scheme, metallic ions from one of the electrodes are introduced into the printing sheet and they are either combined with colorless materials already present in the printing sheet in order to form colored complexes or are precipitated as fine metallic particles.

A disadvantage of the above discussed consumable scheme is the fact that the stylus is consumed in the process. This requires complicated printing mechanisms with feeding devices to keep the stylus working.

In another scheme, the electrodes are not consumed and the writing is accomplished by the electrolytic modification of materials already in the printing sheet. An example of such a procedure is one which employs the reaction of starch and iodine to effect writing. Generally, in this scheme, the electrolysis of potassium iodide or another iodide compound in the paper generates free iodine which reacts with the starch which is also present in the paper, thereby producing a purple starch-iodide complex.

Another example of such a scheme includes dry electrolytic printing in which a very special paper is used consisting of one or two metallized layers. Inherent in this scheme are the disadvantages of requiring expensive paper, requiring special layers of materials, and the requirement of voltages that exceed 100 volts for printing.

The nonconsumable schemes, such as the starch-iodine method, suffer from the lack of permanency of the printing due to fading of the printed works and also the discoloration of the paper upon storage.

Another type of electrochromic printing system is disclosed in U.S. Pat. No. 4,211,616 to Sambucetti.

U.S. Pat. No. 4,211,616 is concerned with an electrochromic printing composition which contains an iodide compound as a color former, a bromide, and an auxiliary dye to enhance the color of the printed indicia. As discussed on column 3 thereof, the additional dye is one which would tend to form addition compounds with the iodine and thereby stabilize the printed indicia.

Examples of such auxiliary dyes include leucomethylene blue and derivatives, leuco crystal violet, and 4,4'-methylenebis N-N dimethyl aniline. Suggested leucomethylene blue derivatives include p-sulfonic-benzoyl leucomethylene blue, p-carboxy-benzoyl leucomethylene blue, benzoyl leuco-N,N'p-benzene sulfonic (symmetrical) methylene blue and benzoyl leuco N,N'-p-naptholsulfonic (symmetrical) methylene blue.

Another electrochromic recording substrate is reported in U.S. Pat. No. 4,309,255 to Gendler, et al. which includes a water soluble salt of 3,7-bis(dimethylamino)-10-(2-sulfobenzoyl)-phenothiazine.

U.S. patent application Ser. No. 231,832, now U.S. Pat. No. 4,374,001 to Bernier discloses an electrochromic printing media which comprises a substrate coated with a leucodye having the following formula:

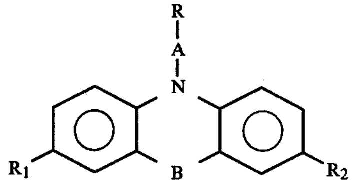

wherein A is C=O or $SO_2$; B is S or O; each $R_1$ and $R_2$ individually is a group capable of donating an electron; and R is an organic radical such that in the presence of bromine and upon being subjected to a voltage, the leucodye converts to a colored dye upon splitting off of the A-R group; and coated with a bromide compound to catalyze an electro-oxidation of the leucodye.

Kitakohju, et al. "Dichromic Electrolytic Recording Paper", Fujitsu Scientific & Technical Journal, September 1976, pp. 131–145, suggest an electrolytic printing by the direct electroreaction of benzoyl-leucomethylene blue employing voltages of about 170 or about 230 volts.

U.S. Pat. Nos. 3,772,159; 3,816,838; 3,864,684; 3,871,972; 3,951,757; 3,974,041; 4,012,292; 4,133,933; and Re 29,427 are of interest concerning electrorecording members containing various leucodyes in addition to other required components and the use of very high voltages.

U.S. Pat. Nos. 3,713,996 and 3,726,769 are of interest concerning electrolytic electrosensitive printing.

SUMMARY OF INVENTION

The present invention provides printable medium which exhibits improved stability against oxidation. In particular, the present invention provides for improved resistance to premature oxidation prior to the printing process and improved resistance to unwanted oxidation of the undeveloped material subsequent to the printing.

Resistance to discoloration of the background, such as the paper itself, upon storage due to subsequent development of the material on the substrate not subjected to the printing (e.g., voltage pattern) is much higher in accordance with the present invention.

An object of the present invention is to provide an electrochromic printable medium which is suitable in a printing process whereby the power requirements for the printing are such that the desired printing can be operated by use of integrated circuits. In other words, the voltages, currents, and times required for printing are such that they are compatible with those values deliverable by integrated circuits.

Another object of the present invention is to provide an improved printing medium for use in a nonconsumable stylus electrolytic printing process. In addition, an object of the present invention is to provide an electrochromic printing medium in which plain paper can be employed.

The printing medium of the present invention comprises a substrate coated on at least one surface thereof with certain compounds which function as leucodyes.

The compounds employed are represented by the following formula:

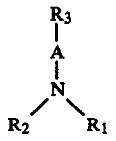

In the above formula, A is C═O. $R_3$ in the above formula, is a ring group having at least one substituent selected from the group of $SO_2F$, $SO_3H$, salts thereof, halo, $NO_2$, thioalkyl, aryl, alkyl, alkoxy, aralkyl, and alkaryl in the ortho position with respect to the atom connected to A. In the event $R_3$ is phenyl, and $R_1$ and $R_2$ are interconnected to form together with the nitrogen atom 3,7-bis(dimethylamino)-phenothiazine moiety, then at least one of the substituents on said phenyl is $SO_2F$, halo, thioalkyl, $NO_2$, aryl, alkyl, aralkyl, alkaryl, or alkoxy. $R_1$ in the above formula is aryl group, alkaryl group, or is interconnected with $R_2$ to form together with the nitrogen atom to which is connected a heterocyclic ring, or substituted derivatives of any of the above. The heterocyclic ring can be phenothiazine, phenoxazine, or phenazine.

$R_2$ in the above formula is an aryl group, alkaryl group, or interconnected with $R_1$ to form together with the nitrogen atom to which is connected a heterocyclic ring, or substituted derivatives of any of the above. The heterocyclic ring can be phenothiazine, phenoxazine, or phenazine.

In addition, mixtures of the above compounds can be employed, if desired.

The substrate is also coated with an oxidizing agent or the reduced form of an oxidizing agent depending upon the type of printing process. The amount employed is that sufficient to catalyze the electro-oxidation of the above compounds to produce a colored image.

The present invention is also concerned with the method of electrochromic printing which comprises applying an electric field in a predetermined pattern across the printable medium described hereinabove.

BEST AND VARIOUS MODES FOR CARRYING OUT INVENTION

The present invention requires coating at least one surface of a substrate with at least one compound represented by the following formula:

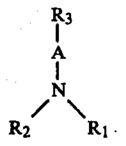

1.

In the above formula, A is C═O.

$R_3$ is a ring group having at least one substituent selected from the group of $SO_3H$, halo, $NO_2$, aryl, alkyl, $SO_2F$, salt thereof, thioalkyl, alkaryl, aralkyl, or alkoxy in the ortho position with respect to the atom connected to A. However, in the event $R_3$ is phenyl, and $R_1$ and $R_2$ are interconnected to form together with the nitrogen atom, 3,7-bis(dimethyl amino)-phenothiazine moiety, than at least one of the substituents on the phenyl ring is selected from the group of $SO_2F$, halo, $NO_2$, aryl, alkyl, thioalkyl, or alkoxy.

The ring group without the above substituents is preferably a hydrocarbon such an aromatic group. The most preferred ring groups are aryl groups containing 6 to 14 carbon atoms and including phenyl, anthracyl, and naphthyl, with phenyl being the most preferred aryl group.

In order to achieve the enhanced resistance to unwanted oxidation, at least one of the positions on the ring group which is ortho to the atom of the ring group which is connected to A must be substituted with a $SO_3H$, salt thereof, $SO_2F$, thioalkyl, halo, $NO_2$, aryl, aralkyl, alkyl, alkaryl, or alkoxy substituent. The preferred substitutions are halo groups such as Cl, Br, F, and I. The aryl substituents generally contain 6 to 14 carbon atoms and include phenyl and naphthyl. The alkyl and alkoxy group can contain 1–22 carbon atoms, and preferably 1 to 4 carbon atoms.

Examples of some alkyl groups are methyl, ethyl, butyl, amyl, hexyl, 2-ethylhexyl, nonyl, and octadecyl. Examples of some alkoxy groups are methoxy, ethoxy, and butoxy. An example of an alkaryl group is benzyl. Examples of aralkyl groups are tolyl, xylyl, and cumyl.

The salts of $SO_3H$ are preferably alkali metal salts such as Na and K.

It is preferred in accordance with the present invention to have 2 or 3 positions on the ring group substituted and most preferably at least one ortho position and the para position relative to the atom connected to A.

$R_1$ in the above formula is aryl group, alkaryl group, or derivatives thereof or preferably $R_1$ is interconnected with $R_2$ to form together with the nitrogen atom to which it is connected a heterocyclic ring selected from the group of phenothiazine, phenoxazine, and phenazine or derivatives thereof.

The aryl groups contain 6 to 14 carbon atoms and include phenyl, naphthyl and anthracyl. An example of an alkaryl group is benzyl.

$R_2$ is an aryl group, alkaryl group, or derivatives thereof, or preferably is interconnected with $R_1$ to form together with nitrogen atom to which it is connected a heterocyclic ring selected from the group of phenothiazine, phenoxazine, and phenazine, or derivatives thereof.

The aryl groups contain 6 to 14 carbon atoms and include phenyl, naphthyl and anthracyl. An example of an alkaryl group is benzyl.

The derivatives of the above $R_1$ and $R_2$ preferably contain groups in at least the para or pseudo-para position relative to the

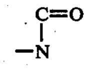

groups which are capable of donating an electron.

Preferably the group at the para or pseudo- para position is an alkyl group, aralkyl group, aryl group, alkaryl, $OR_6$, $SR_6$, or $NR_7R_8$ wherein each $R_6$, $R_7$, and $R_8$ is individually hydrogen or an alkyl group usually containing 1 to 8 carbon atoms and preferably 1 to 4 carbon atoms. The above groups can also be present at other positions on the rings of $R_1$ and $R_2$ if desired.

The alkyl group usually contains 1 to 22 carbon atoms and preferably 1 to 4 carbon atoms. Examples of some alkyl groups are methyl, ethyl, butyl, amyl, and hexyl. Examples of some aralkyl groups include tolyl, xylyl, and cumyl. The aryl groups contain 6 to 14 carbon atoms and include phenyl, naphthyl, and anthracyl. An example of an alkaryl group is benzyl.

The preferred compounds employed in accordance with the present invention are represented by the following formula:

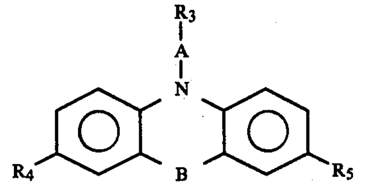

wherein A is C═O and B is S or O or N. $R_3$ is the same as defined hereinabove. Each $R_4$ and $R_5$ of the above formula individually is a group capable of donating an electron and is preferably selected from the group of $SR_6$, $OR_6$, $NR_7R_8$, and $R_9$. Each $R_6$, $R_7$, and $R_8$ is individually hydrogen or an alkyl group generally containing 1 to 8 carbon atoms. Each $R_9$ is an alkyl group usually containing 1 to 8 carbon atoms. The most preferred $R_4$ and $R_5$ groups are OH, $N(CH_3)_2$, $N(C_2H_5)_2$, and $NCH_3H$.

Examples of some compounds within the scope of the present invention are represented by the following formula:

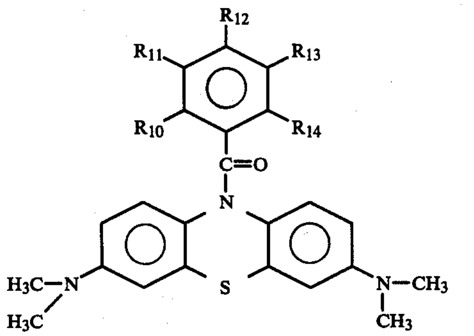

3.

I. $R_{10}$ is F and $R_{11}$, $R_{12}$, $R_{13}$, and $R_{14}$ are H.
II. $R_{10}$ is Cl and $R_{11}$, $R_{12}$, $R_{13}$, and $R_{14}$ are H.
III. $R_{10}$ and $R_{12}$ are Cl and $R_{11}$, $R_{13}$, and $R_{14}$ are H.
IV. $R_{10}$ and $R_{14}$ are Cl and $R_{11}$, $R_{12}$, and $R_{13}$ are H.
V. $R_{10}$ is Br and $R_{11}$, $R_{12}$, $R_{13}$, and $R_{14}$ are H.
VI. $R_{10}$ is I and $R_{11}$, $R_{12}$, $R_{13}$, and $R_{14}$ are H.
VII. $R_{10}$, $R_{11}$, $R_{13}$ are I, $R_{12}$ and $R_{14}$ are H.
VIII. $R_{10}$ is Cl, $R_{13}$ is $SO_2F$, and $R_{11}$, $R_{12}$, and $R_{14}$ are H.
IX. $R_{10}$ and $R_{12}$ are Cl, $R_{14}$ is $SO_2F$, and $R_{11}$ and $R_{13}$ are H.
X. $R_{10}$ is Cl, $R_{13}$ is $SO_3H$, and $R_{11}$, $R_{12}$, and $R_{14}$ are H.
XI. $R_{10}$ and $R_{12}$ are Cl, $R_{13}$ is $SO_3H$ and $R_{11}$ and $R_{14}$ are H.
XII. $R_{10}$ is $CH_3$ and $R_{11}$, $R_{12}$, $R_{13}$, and $R_{14}$ are H.
XIII. $R_{10}$ is phenyl, and $R_{11}$, $R_{12}$, $R_{13}$, and $R_{14}$ are H.
XIV. $R_{10}$ is $OCH_3$ and $R_{11}$, $R_{12}$, $R_{13}$, and $R_{14}$ are H.
XV. $R_{10}$ and $R_{14}$ are $OCH_3$ and $R_{11}$, $R_{12}$, and $R_{13}$ are H.
XVI. $R_{10}$ is Cl, $R_{12}$ is $NO_2$ and $R_{11}$, $R_{13}$, and $R_{14}$ and H.
XVII. $R_{10}$ is Cl, $R_{14}$ is F and $R_{11}$, $R_{12}$, and $R_{13}$ are H.

Compounds within the scope of the present invention can be prepared employing a pH controlled two-phase Schotten-Bauman reaction. The reaction includes contacting the dye (e.g., methylene blue) and sodium dithianite to effect reduction to the leucodye. The leucodye is then acrylated by reaction with an acid chloride or its equivalent to provide substituted compounds employed pursuant to the present invention. An illustrative reaction scheme is as follows:

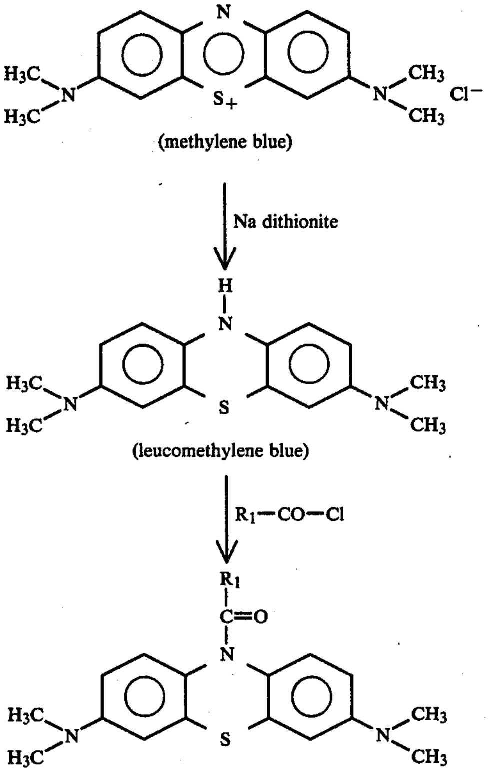

(methylene blue)
(leucomethylene blue)

Non-crystalline crude products are separated from the aqueous layer by $CH_2Cl_2$ extraction followed by purification by chromatography or recrystallization of both.

Mixtures of the above compounds can be employed if desired. Also, mixtures of one or more of the above compounds with other types of compounds capable of acting as leucodyes can be used when desired.

The compound can be applied to the substrate in the form of a solution or dispersion in water or organic solvent depending upon the solubility characteristics of the particular compound employed. Typical examples of suitable solvents for various of the above compounds of I–XVII are alcohols such as ethyl alcohol, ketones such as acetone, and chlorinated hydrocarbons such as chloroform and methylene chloride. Many of the above compounds are soluble or dispersible in water.

The compound is generally employed in amounts of about 2 to about 100 milligrams per standard page (e.g., 8½" by 11" substrate area). Of course, the relative amount of compound will be adjusted upwardly or downwardly depending upon the size of substrate specifically employed. Amounts greater than about 20 milligrams for the above size substrate are generally not necessary.

In addition, the substrate surface is coated with the reduced form of an oxidizing agent such as a bromide compound or an oxidizing agent depending upon the type of printing to be used. For instance, the reduced form of the oxidizing is employed for the preferred electrochromic printing pursuant to the present invention, whereas oxidizing agents per se can be used for thermal and pressure sensitive printing techniques.

Examples of suitable bromides include ammonium bromide, potassium bromide, and sodium bromide. Mixtures can be employed if desired. The reduced form of the oxidizing agent such as the bromide is present in amounts from about 10 milligrams to about ½ gram per standard page (e.g., 8½" by 11" size substrate). Generally, such is present in an amount so as to provide an oxidizing agent in reduced form to dye weight ratio of about 1 to about 1 to about 40 to about 1. The preferred weight ratio is about 5:1 to about 30:1. With a bromide as the reduced form of the oxidizing agent, it is believed that the following reaction is accomplished when a current pulse is passed to a substrate having the printing composition thereon:

$2Br^- \text{ - - - } Br_2 + 2e^-$(at anode $Br_2$+Leucodye - - - $2Br^-$+Colored Dye.

The oxidizing agent is present so as to provide an electrooxidation of the colorless compound (e.g., leucodye) into a colored dye. The bromine is generated at the anode.

A preferred bromide composition contains about 20% by weight of ammonium bromide and most preferably potassium bromide and a buffer such as about 1.4% by weight of $KH_2PO_4$.

The substrate employed can be ordinary paper. It is preferred that the medium is at least substantially free from color-forming agents which might tend to react chemically with the dyes.

At least one surface of the substrate is generally coated by applying the reduced form of the oxidizing agent such as the bromide compound in the form of an aqueous solution and at least one of the above disclosed compounds. If desired, the compound can be applied and then the bromide compound, or can be applied in the same diluent depending upon solubility. Also, if desired, the substrate can be coated on both surfaces or even totally impregnated with the compositions.

The printing composition can be applied to the substrate, such as ordinary paper, by spraying or other coating techniques. It can be applied just prior to printing or can be applied to the substrate to be used at some future time.

Printing can be provided by conventional electrolytic printers. Particularly, nonconsumable electrodes can be used. A voltage of about 1 to about 25 volts is all that is required when employing the printing medium of the present invention to effect the color change. Generally, about 5 volts or more are employed to operate the electronics of the circuitry used. In addition, the voltage, current, and time required are all compatible with those parameters achieved by modern day integrated circuits. The time employed is generally from about 100 to about 1,000 microseconds. In addition, for a 10 mil electrode up to only about 4 milliamps of current is generally needed. The amount of current will change depending upon the size of the electrode.

If the reduced form of the oxidizing agent such as the bromide compound is not present, the printing achieved by the preferred process of the present invention would not be obtainable. For instance, only very little printing can be achieved, even employing very long pulses of about 10 to about 20 milliseconds and voltages up to 30 v. when the reduced form of an oxidizing agent is not employed on the substrate using the compounds of the present invention.

Although the compounds, in accordance with the present invention, can be used in many different types of printing processes including thermal printing and pressure sensitive printing as stated hereinabove, the compounds are most advantageously used in the type of electrolytic printing discussed hereinabove with the reduced form of an oxidizing agent. The conditions employed for such printing are quite different from those required, for instance, in dry electrolytic printing. The large voltages required for such electrolytic printing do not render such medium suitable for use with integrated circuits. The power requirements are not compatible with those generated by integrated circuits.

The substrate or paper is generally wetted by water immediately prior to printing. The pH of the water is usually about 7.

The following nonlimiting examples are presented to further illustrate the present invention. Examples 1 to 16 illustrate the preparation of various compounds within the scope of the present invention.

EXAMPLE 1

Preparation of 2'Chlorobenzoyl Leucomethylene Blue

To a 250 ml round-bottom, 3-neck flask fitted with a mechanical stirrer, an addition funnel capped with an argon inlet, and a pH electrode are added about 3.2 grams of methylene blue (10 mm, 100 m%), about 10 ml ethylacetate, about 50 ml water and about 4.35 grams sodium dithionite (20 mm, 200 m%). The mixture is stirred as it decolorized and 40% sodium hydroxide is added to raise the pH to 5–6. A solution of about 5.95 grams of orthochlorobenzoylchloride in about 5 ml ethylacetate is added over about 5 minutes while the pH is maintained at 5–6 by the addition of 40% NaOH. A precipitate forms after a few minutes and the reaction is stirred for about 90 minutes. Thin layer chromatography (TLC) of the ethylacetate layer reveals that the leucomethylene blue is almost entirely consumed by the absence of a blue streak terminating in a blue spot at $R_f$0.75. The product appears as a yellowish spot at 0.73 which slowly turns blue after the plate has been visualized with short UV light. After about 2 hours, the reaction mass is decanted into a beaker and stirred overnight to ensure that all of the leucomethylene blue is converted to methylene blue as the ethylacetate evaporates. The resulting precipitate is filtered, washed with water, and recrystallized from aqueous acetone to give 1.094 grams of product. The product is identified as the desired material and has the following properties:

mp191°–4° C. 1H NMR:Δ(DEL.):7,53(m,7H); 6,567(d,J=2,5,2H); 6.49(s(broad),2H); 284(s,12H). m/e: 425,423; 387; 284; 268; 141,139; 111. :λ(LA.) (max) (EtOH) (:ε(EP.)x 10–3):314sh(8.0); 283sh(15.0; 259(32.9). IR(KBr): 1639s, 1585vs. The samples for x-ray is obtained by recrystallizing 350 mg from 50 ml EtOH.CV 0.70v.

CV refers to the oxidation potential or cyclic voltometry of the material and correlates to the stability of the material to resist oxidation. For instance, the higher the CV value, the greater the stability.

The analyses in this example and the others herein are preformed as follows:

1H NMR spectra are taken on a Varian EM390 spectrometer in deuterochloroform with internal TMS as standard, 13 C NMR spectra are taken on a Varian CFT-20 spectrometer, VV/VIS spectra are taken on a Cary 170 spectrometer in ethyl alcohol (ETOH); low resolution MS are determined on an AEI MS 30, 1R are taken on a Perkin-Elmer Model 283 in KBr pellets and the electrochemistry is performed by a PAR 173 potentiostat with a Model 175 universal programmer.

Unless stated otherwise, all potentials reported are relative to a sodium standard calomel electrode in 0.1 N tetraethylammonium fluoroborate in acetonitrile with about 0.001 M active species.

EXAMPLE 2

Preparation of 2',4'-Dichlorobenzoyl Leucomethylene Blue

Example 1 is repeated except that about 3.56 grams of ortho, para dichlorobenzoyl chloride is employed in place of the ortho-chlorobenzoyl chloride. About 1.728 grams of the product are obtained. The product is identified as the desired material. The properties are as follows:

mp172°-174° C. 1H NMR:DEL.:7.47(s(broad),2H); 7.37(s(broad),2H); 7.10(s,2H); 6.71(d,J=3,2H); 6.60(s(broad),2H); 2.94(s,12H). m/e: 459,457; 284; 268, 175,173; 147,145; 111,109; 85,83. IR(DBr): 1638s, 1588vs. :LA.(max) (EtOH) (:EP.x10-3): sh320 (10.9),259(50.0).CV 0.73v.

EXAMPLE 3

Preparation of 2'Bromo-benzoyl Leucomethylene blue

Example 1 is repeated except that about 3.73 grams of orthobromobenzoyl chloride are employed in place of the orthochlorobenzoyl chloride. In addition, the product is obtained by chromatography by adsorbing the crude residue after evaporation of the ethyl acetate onto about 10 grams silica and then employing 100 grams silica and 50% ethylacetate/hexane solution for elution. The product is then recrystallized from aqueous acetone. About 2 grams of product are obtained.

The product is identified as the desired material and has the following properties:

mp(acetone/water)204-206. 5° C. 1H NMR:DEL.:7.47(m,2H); 7.04(m,4H); 6.66(d,J=3,2H; 6.52(s(broad),2H); 2.88(s,12H). m/e: 469,467; 387; 284; 268; 185,183; 156,154. :LA.(max) (EtOH) (:EP.x 10-3):sh320 (7.4); 259(37.7).CV 0.71v.

EXAMPLE 4

Preparation of 2'Chloro-6'-Fluorobenzoyl Leucomethylene Blue

Example 1 is repeated except that about 2.94 grams of 2 chloro,6 fluorobenzoyl chloride are employed in place of the orthochlorobenzoyl chloride. In addition, the product is obtained by chromotography by adsorbing the crude residue after evaporation of the ethyl acetate onto about 10 grams silica and then employed 100 grams silica and 50% ethylacetate/hexane solution for elution. About 560 mg of product are obtained.

The product is identified as the desired material and has the following properties:

mp223°-225° C. (acetone/water) 1H NMR(DMSO-$d^6$):DEL.:7.39(m,3H); 7.08(m,1H); 6.72(m,4H); 6.25(d,dJ=3,9,1H); 2.91(s,6H); 2.74(s,6H). m/e:443,441; 284; 268; 159,157; 141; 85,83. :LA.(-max)(EtOH):EP.x10-3: sh317 (9.2), sh288 (19.0), 260 (44.3). IR: 1655vs; 1593vs.CV 0.80v.

EXAMPLE 5

Preparation of 2'Chloro-4'-Nitrobenzoyl Leucomethylene Blue

Example 2 is repeated except that about 3.74 grams of orthochloro, para nitro-benzoyl chloride are employed in place of ortho, para dichlorobenzoyl choride. About 1.41 grams of product are obtained. The product is identified as the desired material and has the following characteristics:

NMR(CDCl3):DE.: 8.20(s,1H); 7.81(m,3H); 6.69(m, 4H); 6.17(d,broad,1H); 2.95(s,6H);2.86(s,6H). m/e: 470,468; 284; 268; 252; 240; 225; 142; 138; 134; 95,93. mp 190°-192° C. LA.(max)(EtOH):EP.x-10-3: sh,broad,360 (2.0); sh,281(32.4); 258 (46.8).CV 0.78v.

EXAMPLE 6

Preparation of 2'Fluorobenzoyl Leucomethylene Blue

Example 2 is repeated except that about 2.70 grams orthofluorobenzoyl chloride are employed in place of the ortho, para dichlorobenzoyl chloride. About 2.05 grams of product are obtained. The product is identified as the desired material and has the following characteristics:

mp 192°-194° C. NMR(CDCl3):DE.: 7.13(m,8H); 6.69(d,J=3,2H); 6.43(d,broad,J=9,2H); 2.89(s,12H). m/e: 407; 284; 268; 252; 240; 225; 123; 95; 75. :LA.(max)(EtOH):EP.x10-3: sh,318 (6.5), sh, 286 (13.0), 258 (30.3).CV 0.69v.

EXAMPLE 7

Preparation of 2'-Iodobenzoyl Leucomethylene Blue

Example 2 is repeated except that about 4.528 grams of ortho-iodobenzoylchloride are employed in place of the ortho, para dichlorobenzoylchloride. About 2 grams of product are obtained. The product is identified as the desired material and has the following characteristics:

mp 179°-184° C. NMR(CDCl3):DE.: 7.78(m,2H); 6.99(m,3H); 6.62(m,3H); 6.18(s,broad,2H); 2.89(s,12H). :LA. (max) (EtOH):EP.x10-3: sh320 (10.0); 259 (50.3).CV 0.68v.

EXAMPLE 8

Preparation of 2'Phenylbenzoyl Leucomentylene Blue

Example 4 is repeated except that about 3.68 grams of 2 phenylbenzoylchloride are employed in place of 2 chloro, 6 fluorobenzoyl chloride. About 3.21 grams of the product are obtained. The product is identified as the desired material and has the following characteristics:

mp 130°-132° C. NMR(CDCl3)DE.: 7.31(m,10H); 6.38(m,broad,5H); 2.86(s,12H).:LA.(max) (EtOH)-:EP.x10-3: sh318 (8.6), 258 (49.1).CV 0.63v.

EXAMPLE 9

Preparation of 2'methoxy Benzoylleucomethylene Blue

Example 2 is repeated except that about 2.9 grams of orthomethoxy benzoyl chloride are employed in place of ortho, para dichlorobenzoyl chloride. The product is identified as the desired material and has the following characteristics:

mp 125°-128° C. NMR(CDCl3):DE.: 7.23(m), 6.69(m), 6.41(s,broad), 10H total; 3.66(s,broad, 3H); 2.88(s,12H). m/e: 419; 313; 284; 268; 135; 105; 93;

77. :LA.(max) (EtOH):EP.x10-3: sh321 (10.1), sh285 (25.7), 258 (51.3)). CV 0.59v.

EXAMPLE 10

Preparation of 2',6'-Dimethoxy Benzoyl Leucomethylene Blue

Example 2 is repeated except that about 3.41 grams of 2,6 dimethoxy benzoyl chloride are employed in place of the ortho, para dichlorobenzoyl chloride and the product is subjected to chromotograhy and recrystallization two times. About 77 milligrams of product are obtained. The product is identified as the desired material and has the following characteristics:

mp 145°-155° C. m/e: 449; 285; 165; 86. NMR(CDCl3):DE.: 7.64(d,J=10,1H); 7.07(t,J-8,1H); 3.41(s,3H); 2.90(s,6H); 2.79(s,3H). CV 0.62v.:LA.(max) (EtOH):EP.x10-3: sh315 (8.9), sh282 (32.7); 258 (56.7).

EXAMPLE 11

Preparation of 2',3',5'Triiodobenzoyl Leucomethylene Blue

Example 2 is repeated except that about 7.77 grams of 2,3,5 triiodobenzoyl chloride is employed in place of the ortho, pra dichlorobenzoyl chloride. About 5.93 grams of product are obtained. The product is identified as the desired material and has the following characteristics:

mp: sintering above 185° C. gradual melting with decomposition to 220° C. NMR(CDCl3):DE.: 8.02(m,1H); 7.62(m,broad, 1H); 6.73(m,5H); 6.26(d,d,broad,J=3,9,2H); 2.94(s,6H); 2.89(s,6H). m/e: 767; 641; 581; 513; 500; 483; 456; 374; 284; 270; 128,127; 85,83. :LA.(max) (EtOH):EP.x10-3: sh320 (8.2); 258 (62.3).CV 0.78v.

EXAMPLE 12

Preparation of 2'Toluoyl Leucomethylene Blue

Example 4 is repeated except that about 2.628 grams of 2'-toluoyl chloride are employed as the acid chloride. About 0.977 grams of product are obtained. The product is identified as the desired material and has the following characteristics:

1H NMR:DEL.:7.09(m,6H); 6.66(d,J=3,2H); 6.41(d(broad),J=9,2H); 2.88(s,12H); 2.38(s,3H). :LA.(max) (EtOH) (:EP.x10-3) :sh320(10.4); sh285(25.7); 258(54.8). m/e:403; 284; 268; 119; 91. CV 0.59v.

EXAMPLE 13

Preparation of 2'Chloro Benzoylleucobasic Blue 3

Example 1 is repeated except that about 4.04 grams of benzoyl leucobasic blue 3 (i.e., 10 benzoyl-3,7-bis(diethylamino)-10-H phenoxazine) of orthochloro benzoyl chloride are employed as the reactants. About 1.7 grams of product are obtained. The product is identified as the desired material and has the following characteristics:

mp 161°-163° C. NMR(CDCl3):DE.: m/e: 465,463; 324; 280; 236; 139; 112; 83; 77. CV 0.61v.

EXAMPLE 14

Preparation of 2',4'Dichloro Benzoyl Leucobasic Blue 3

Example 1 is repeated except that about 4.04 grams of benzoyl leucobasic blue 3 and about 3.56 grams of ortho, para dichloro benzoyl chloride are employed as the reactants. About 2.27 grams of product are obtained. The product is identified as the desired material and has the following characteristics:

mp 128°-131° C. NMR(CECl3):DE.: 7.28(m), 6.87(s,broad), 5H total; 6.37(d,J=2.5,2H); 6.19(d,d,broad,2H); 3.29(q,J=8,8H); 1.13(t,J=8,12H). m/e: 501,499,497; 463,461; 324; 310; 294; 280; 250; 236; 175,173. CV 0.61v.

EXAMPLE 15

Preparation of 2'Chloro-5'-Sulfo Benzoyl Leuco Benzoyl Methylene Blue (a). Preparation of 2-chloro-5-bhlorosulfonylbenzoic acid To a 100 ml round-bottom 3-neck flask fitted with a magnetic stir-bar and an argon-capped reflux condenser are added about 10 grams of 2-chlorobenzoic acid and about 60 grams of chlorosulfonic acid.

The resulting solution is heated at 140° C. overnight until the starting acid is consumed. The hot solution is carefully poured onto ice and the precipitate is removed, washed with water, and dried to give 12.40 g of product having mp 140° C. (LIT. 147°-9° C. Ger. Patent 864,829 (1959)). NMR (acetone-d6) :DEL.: 8.56(d,J=3.1dH); 8.29(d,d,J=3,9,1H); 8.07(d,J=9.1H); 7.22($s_{broad}$,1H). m/e: 256,254; 239,237; 221,219; 157,155.

(b). Preparation of 2-chloro-5-fluorosulfonybenzoic acid

To a 100 ml Erlenmeyer flask fitted with a magnetic stir-bar are added about 8.16 grams 2-chloro-5-chlorosulfonylbenzoic acid between from Part a, about 2.79 grams of potassium fluoride, about 16 ml of dioxane, and about 64 ml of water. The mixture is refluxed in a 105° C. oil bath for 45 minutes, cooled, diluted with water, and allowed to stand. The precipitate is removed, washed with water, and dried to give about 5.45 g of product of mp 143°-145° F. (lit 147°-150° F.). The product has the following properties:

IR(KBr): 5.83vs; 7.07vs; 8.25vs. m/e: 240,238; 223,221; 158; 126; 110; 99; 75.

(c). Preparation of 2-chloro-5-fluorosulfonylbenzoyl chloride

To a 100 ml round-bottom flask fitted with a stir-bar, and an argon-bubbler capped reflux condenser are added about 3.579 grams of 2-chloro-5-fluorosulfonylbenzoic acid obtained from (b) and about 15 ml of thionyl chloride. The mixture is refluxed for one hour and the solvent is evaporated with a methylene choride chaser to give about 3.76 g of product having the following characteristics:

mp 52.5-54:°C., IR(KBr): 5.65vs; 7.06vs; 8.20vs. m/e: 260,258,256; 240,238; 223,221; 195,193; 175,173; 158; 139; 128,126; 109; 75.

(d). Preparation of 10-(2-chloro-5-fluorosulfonyl) benzoyl leucomethylene blue

To a 250 ml round-bottom three neck flask fitted with an argon bubbler capped reflux condenser, a mechanical stirrer and a pH electrode are added about 3.739 grms of methylene blue, about 50 ml of ethyl acetate, about 50 ml of water, and about 3.48 grams of sodium dithionite. The mixture is stirred as it decolorized and the pH is adjusted to 5.5-6.0 with 40% sodium hydroxide. About 3.76 grams of 2-chloro-5-fluorosulfonylbenzoyl chloride from step (c) are dissolved in about 25 ml ethylacetate/10 ml methylene chloride with heating and added dropwise via the addition funnel to the reaction while maintaining the pH at about 5.5-6.0. The reaction is stirred for about 2 hours as a tan precipitate forms. The mixture is decanted into a beaker and air is bubbled through to convert any remaining leucomethylene blue to the dye. The precipitate is filtered, washed with water, and dried to give about 4.56 g. Recrystallization from about 150 ml aqueous acetone gives about 4.07 grams of pure product. The product has the following properties:

mp. 219.5°-220.5° C. NMR(CDC13):DEL.: 7.84, 7.74, 7.66 broad, 7.53(d,J=9) 4H total; 6.69 ($s_{broad}$), 6.59($s_{broad}$), 4H total; 6.20($s_{broad}$,1H); 2.61(m,12H). m/e: 507,505(m+); 491; 478,476; 471,469; 425,423; 387; 299; 285, 268; 252; 240; 225; 221; 196; 142; 234; 75. :LA. (max) (EtOH) (:EP.x10-3): sh318(8.9); 261(44.2); 233(23.5). CV 0.75v.

(e). Preparation of 10-(2-chloro-5-sulfo) benzoyl leucomethylene blue

To a 250 ml round-bottom flask fitted with an argon capped reflux condenser and a stir-bar are added about 947.6 mg of the 10-(2-chloro-5-fluorosulfonyl) benzoyl leucomethylene blue, about 80 ml of dioxane/water-1:1, about 460 mg acetic acid, and about 808 mg of triethylamine. The mixture is refluxed in an oil bath until the sulfonylfluoride is hydrolyzed to the sulfonic acid. The solvents are removed and the residue chromatographed on about 30 grams of silica (30 g) with 50% ethylacetate/methylalcohol as eluant. The product is obtained as a very light blue glass in quantitative yield. It can be converted to the potassium salt by dissolving in aqueous methanol and adding KOH to pH 7 and then evaporating. The product is identified as the desired material and has the following characteristics:

:LA.(max) (EtOH) (:EP.x10-3): sh320(9.9); 259(35.8); sh222(25.6). CV(in water): 0.57; CV(water+oxalic acid): 0.69.

EXAMPLE 16

Preparation of 2'4-Dichloro-5'-Sulfobenzoylleucomethylene Blue (a). Preparation of 2,4-dichloro-5'-chlorosulfonylbenzoic acid Part (a) of Example 15 is repeated except that about 15.07 grams of 2,4 dichlorobenzoic acid are employed as the benzoic acid. The product has the following properties:

mp 174°-176° C. NMR(acetone-d6) :DEL.: 8.70 (s,1H); 8.13(s,1H); 7.22($s_{broad}$,1H). IR(KBr): 3450(broad)m; 3105m; 1726vs, sh1717vs; 1690m. m/e: 292,290,288; 275,273,271; 255,253; 207,205; 191,189.

(b). Preparation of 2,4-dichloro-5-fluorosulfonylbenzoic acid

Step b of Example 15 is repeated except that the 2.4-dichloro-5-chloro-sulfonylbenzoic acid from step (a) of this example is employed. About 6.53 grams of product having the following properties are obtained:

6.53 g mp 171°-173° C. lit mp 180°-182° C. IR(KBr): 5.81vs; 7.03vs; 8.19vs. m/e: 276,276,272; 259,257,522; 207,205; 192; 174,172; 162,160; 135,133; 109; 99,97; 84; 74.

(c). Preparation of 2,4-dichloro-5-fluorosulfonylbenzoyl chloride

Part c of Example 15 is repeated except that the 2,4 dichloro-5-fluoro-sulfonylbenzoic acid from step (b) of this example is employed. About 4.3 grams of the product having the following properties are obtained:

mp 63°-65° C. m/e: 291,289; 274,272; 259,257,255; 223,221; 174,172; 162,160; 146,144; 109; 97; 84; 73.IR(KBr): 5.62vs, sh5.72vs; 7.06vs; 8.23vs.

(d). Preparation of 10-(2,4-dichloro-5-fluorosulfonyl)-benzoyl leucomethylene blue Part d of Example 15 is repeated except that the 2,4-dichloro-5-fluorosulfonyl benzoyl chloride from step c of this example is employed. About 4.49 grams of product having the following properties are obtained:

mp 225.5°-227° C. NMR(CDCL):DEL.: 8.01(s,1H); 7.66)s broad), 7.56(s), 2H total; 6.71(m), 6.59(s broad), 4H total; 6.26(s broad,1H); 2.94(s,12H). m/e: 543,541,539(m+); 505 461,459,457; 423,421; 299; 284; 268; 252; 240; 228; 225; 196; 141; 134; 109; 75.5. :LA.(max) (EtOH) (:EP.x10-3): sh310(7.6); 260(41.1). CV 0.75v.

(e). Preparation of 10-(2,4-dichloro-5-sulfo)benzoylleucomethylene blue

Part e of Example 15 is repeated except that the 10-(2,4-dichloro-5-fluorosulfonyl)-benzoyl leucomethylene blue is employed. During the chromatography of the product, the early fractions solidified. THe CV (water) of the product is 0.61 and (water+oxalic acid) is 0.72.

The following examples illustrate the use of the compounds in printing.

EXAMPLE 17

Paper sheet (about 3½"×11", No. 4 bond copier type paper) is coated with an aqueous composition containing about 20% by weight of potassium bromide and buffered to pH-11 with potassium dihydrogen phosphate. The composition is sprayed onto the paper. After drying, the paper is then coated by spraying with a solution of about 1% by weight of 2'chlorobenzoylleucomethylene blue prepared in accordance with Example 1 in acetone to provide about 15-20 mg of leuco dye per square foot of substrate. The paper is then subjected to electrolytic printing apparatus. Indicia is then electrolytically printed on the paper by applying in a predetermined voltage pattern of about 25 volts thereacross. The pulse time is about 500 microseconds. The electrode employed is about 6 mils diameter and about 3-4 milliamps of current are employed. The printed indicia is a turquoise-blue.

The indicia printed under normal conditions of storage is is substantially permanent and does not fade. Formation of background due to subsequent development of the undeveloped portions is significantly reduced as compared to benzoylleucomethylene blue and to 4'chlorobenzoylleucomethylene blue.

EXAMPLE 18

The procedure of Example 17 is repeated, except that the dye employed is 2'4'dichlorobenzoylleucomethylene blue prepared in accordance with Example 2. The results obtained are similar to those of Example 17.

EXAMPLE 19

The procedure of Example 17 is repeated, except that the dye employed is 2'bromobenzoylleucomethylene blue prepared in accordance with Example 3. The results obtained are similar to those of Example 17.

EXAMPLE 20

The procedure of Example 17 is repeated, except that the dye employed is 2'fluorobenzoylleucomethylene blue prepared in accordance with Example 6. The results obtained are similar to those of Example 17.

EXAMPLE 21

The procedure of Example 17 is repeated, except that the dye employed is 2'iodobenzoylleucomethylene blue prepared in accordance with Example 7. The results obtained are similar to those of Example 17.

EXAMPLE 22

The procedure of Example 17 is repeated, except that the dye employed is 2'phenylbenzoylleucomethylene blue prepared in accordance with Example 8. The results obtained are similar to those of Example 17.

EXAMPLE 23

The procedure of Example 17 is repeated, except that the dye employed is 2'-methoxybenzoylleucomethylene blue prepared in accordance with Example 9. The results obtained are similar to those of Example 17.

EXAMPLE 24

The procedure of Example 17 is repeated, except that the dye employed is 2',6'dimethoxybenzoylleucomethylene blue prepared in accordance with Example 10. The results obtained are similar to those of Example 17.

EXAMPLE 25

The procedure of Example 17 is repeated, except that the dye employed is 2'toluoylleucomethylene blue prepared in accordance with Example 12. The results obtained are similar to those of Example 17.

EXAMPLE 26

The procedure of Example 17 is repeated, except that the dye employed is 2'chloro-benzoylleucobasic blue 3 prepared in accordance with Example 13. The results obtained are better than those from using benzoylleucobasic blue 3 tested under the same conditions.

EXAMPLE 27

The procedure of Example 17 is repeated, except that the dye employed is 2',4'dichlorobenzoylleucobasic blue 3 prepared in accordance with Example 14. The results obtained are similar to those of Example 16.

EXAMPLE 28

The procedure of Example 17 is repeated, except that the dye employed is 2'-chloro-5'sulfobenzoylleucomethylene blue prepared in accordance with Example 15. The results obtained are similar to those of Example 17.

EXAMPLE 29

The procedure of Example 17 is repeated, except that the dye employed is 2,',4'-dichloro-5'-sulfobenzoylleucomethylene blue prepared in accordance with Example 16. The results obtained are similar to those of Example 17.

In addition, the procedure of Example 17 is repeated with 2'chloro-6'fluorobenzoylleucomethylene blue, 2'chloro-4'-nitrobenzoyleucomethylene blue, and 2', 3', 5'-triiodobenzoylleucomethylene blue, but such are too stable for printing under the conditions employed, and require oxidizing agents stronger than bromine such as cerium$^{+3}$ for printing. However, these substituted benzoyl rings (i.e. 2'chloro-6'fluorobenzoyl, 2'chloro-4'nitrobenzoyl and 2', 3', 5'triiodobenzoyl) when attached to a leucobasic blue 3 molecule provide materials printable under the conditions employed in Example 17.

What is claimed is:

1. A printing medium which comprises a substrated coated on at least one surface thereof with a compound of the following formula:

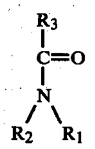

wherein $R_3$ is a ring group having at least one substituent selected from the group of $SO_2F$, salt thereof, $SO_3H$, salt thereof, halo, $NO_2$, aryl, thioalkyl, aralkyl, alkyl, alkaryl, or alkoxy in the ortho position with respect to the atom connected to C=O with the proviso that when $R_3$ is phenyl, and $R_1$ and $R_2$ are interconnected to form together with the nitrogen atom 3,7-bis(-dimethylamino)-phenothiazine moiety, then at least one of the substituents on said phenyl is selected from the group $SO_2F$, thioalkyl, halo, $NO_2$, aryl, aralkyl, alkyl, alkaryl, or alkoxy; $R_1$ is aryl group, alkaryl group, or interconnected with $R_2$ to form together with the nitrogen atom to which it is connected a heterocyclic ring selected from the group of phenothiazine, phenoxazine, or phenazine; and substituted derivatives thereof; and $R_2$ is aryl group, alkaryl, or interconnected with $R_1$ to form together with the nitrogen atom to which it is connected a heterocyclic ring selected from the group of phenothiazine, phenoxazine, or phenazine; and substituted derivatives thereof; or mixtures thereof; and coated with an oxidizing agent or the reduced form thereof to catalyze an oxidation of said compound.

2. The medium of claim 1 wherein $R_3$ is a substituted phenyl ring.

3. The medium of claim 1 wherein at least one of the substituents in said ortho position of $R_3$ is a halo group.

4. The medium of claim 1 wherein $R_1$ and $R_2$ are interconnected to form together with the nitrogen atom to which they are connected a heterocyclic ring selected from the group of phenothiazine, phenoxazine, or phenazine; or substituted derivatives thereof.

5. The medium of claim 1 wherein said compound is represented by the formula:

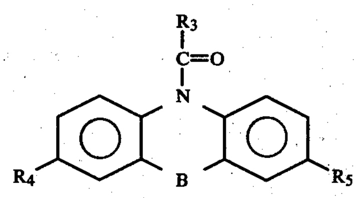

wherein $R_4$ and $R_5$ are each individually a group capable of donating an electron; and B is S or O, or N.

6. The medium of claim 1 wherein $R_3$ is a phenyl group with a member at least one of said ortho positions selected from the group of halo groups, $CH_3$, $OCH_3$, or phenyl.

7. The medium of claim 5 wherein $R_4$ and $R_5$ are each selected from the group of $N(CH_3)_2$ or $N(C_2H_5)_2$.

8. The medium of claim 5 wherein each $R_4$ and $R_5$ is selected from the group of alkyl, aryl, aralkyl, alkaryl, $OR_6$, $SR_6$, $NR_7R_8$ wherein each $R_6$, $R_7$, and $R_8$ is individually hydrogen or an alkyl group.

9. The medium of claim 1 wherein the reduced form of an oxidizing agent is a bromide.

10. The medium of claim 9 wherein the bromide is selected from the group of ammonium bromide, potassium bromide, sodium bromide, and mixtures thereof.

11. The medium of claim 9 wherein the weight ratio of bromide to leucodye is about 1:1 to about 40:1.

12. The medium of claim 9 wherein the weight ratio of bromide to leucodye is about 5:1 to about 30:1.

13. The medium of claim 1 wherein said compound is employed in amounts of about 2 to about 100 milligrams for each 8½"×11" area of substrate.

14. The medium of claim 13 wherein the maximum amount of said compound is about 20 milligrams.

15. The medium of claim 9 wherein said reduced form of oxidizing agent is employed in an amount of about 10 milligrams to about ½ gram for each 8½"×11" area of substrate.

16. The medium of claim 1 wherein said substrate is ordinary paper.

17. A method of electrochromic printing which comprises applying an electrical field in a predetermined pattern across an electrochromic printable medium which comprises a substrate coated on at least one surface thereof with a compound of the following formula:

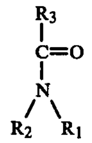

wherein $R_3$ is a ring group having at least one substituent selected from the group of $SO_2F$, $SO_3H$, salts thereof, halo, $NO_2$, aryl, thioalkyl, aralkyl, alkyl, alkaryl, or alkoxy in the ortho position with respect to the atom connected to C═O with the proviso that when $R_3$ is phenyl, and $R_1$ and $R_2$ are interconnected to form together with the nitrogen atom 3,7-bis(dimethylamino)-phenothiazine moiety, then at least one of the substituents on said phenyl is selected from the group of $SO_2F$, halo, thioalkyl, $NO_2$, aryl, aralkyl, alkyl, alkaryl, or alkoxy; $R_1$ is aryl group, alkaryl group, or interconnected with $R_2$ to form together with the nitrogen atom to which it is connected a heterocyclic ring selected from the group of phenothiazine, phenoxazine, or phenazine; and substituted derivatives thereof; and $R_2$ is aryl group, alkaryl, or interconnected with $R_1$ to form together with the nitrogen atom to which it is connected a heterocyclic ring selected from the group of phenothiazine, phenoxazine, and phenazine; and substituted derivatives thereof; or mixtures thereof and coated with the reduced form of an oxidizing agent to catalyze an electrooxidation of said compound.

18. The method of claim 17 wherein the voltage applied is about 1 to about 25 volts.

19. The method of claim 17 wherein the voltage applied is at least about 5 volts.

20. The medium of claim 1 which is substantially free from color-forming agents which tend to react chemically with said compound.

* * * * *

UNITED STATES PATENT AND TRADEMARK OFFICE
CERTIFICATE OF CORRECTION

PATENT NO. : 4,443,302

DATED : April 17, 1984

INVENTOR(S) : Paul L. Gendler, Robert J. Tweig

It is certified that error appears in the above—identified patent and that said Letters Patent is hereby corrected as shown below:

column 7, line 16, "$2Br^- --- Br_2 + 2e^-$ (at anode" should read --$2Br^- --- Br_2 + 2e^-$ (at anode)--.

Column 8, line 52, "6,567(d,J=2,5,2H)" should read --6,567(d,J=2.5,2H)--.

Column 8, line 56, "samples" should read --sample--.

Signed and Sealed this

*Eleventh* Day of *September 1984*

[SEAL]

*Attest:*

GERALD J. MOSSINGHOFF

*Attesting Officer* *Commissioner of Patents and Trademarks*